June 7, 1932. G. POWELL 1,862,516
AXLE BURNISHING MACHINE
Filed June 27, 1929 14 Sheets-Sheet 3
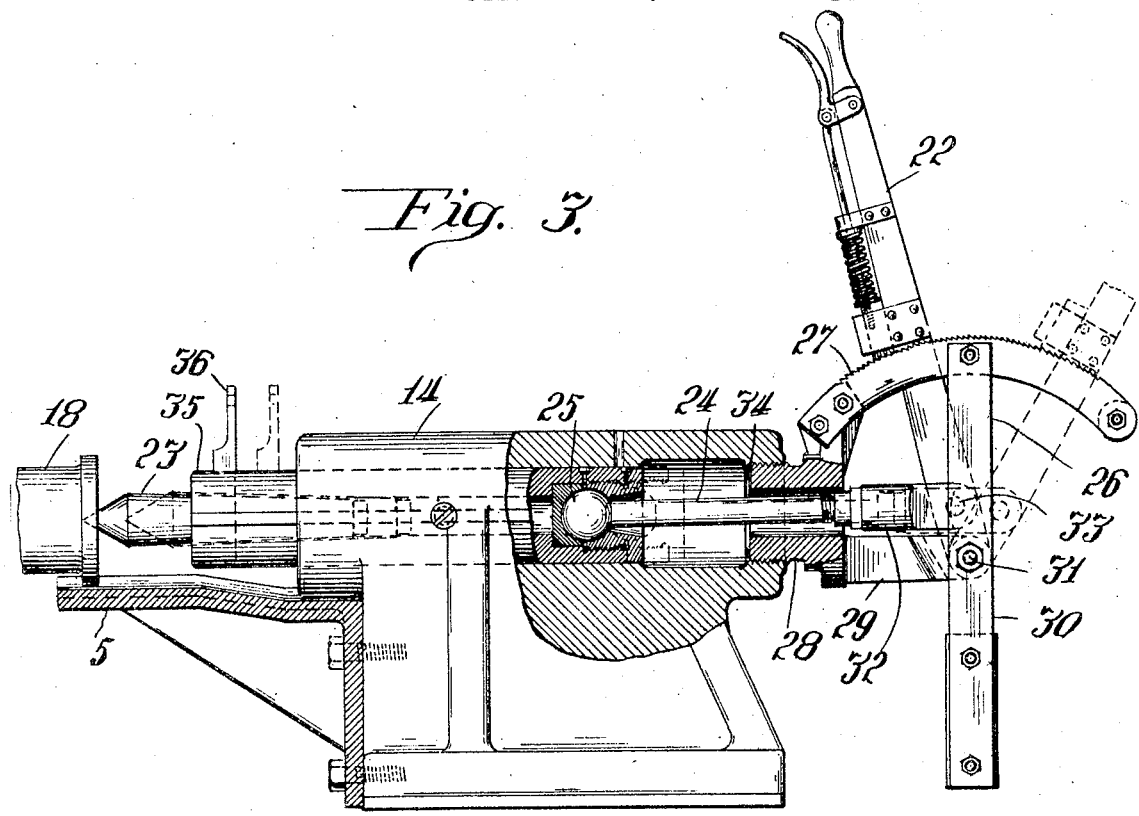
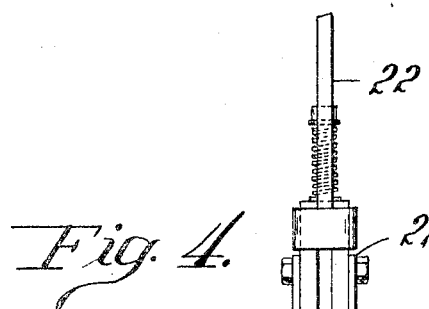
Inventor
Gomert Powell
By Oscar Hochberg.
his Attorney.

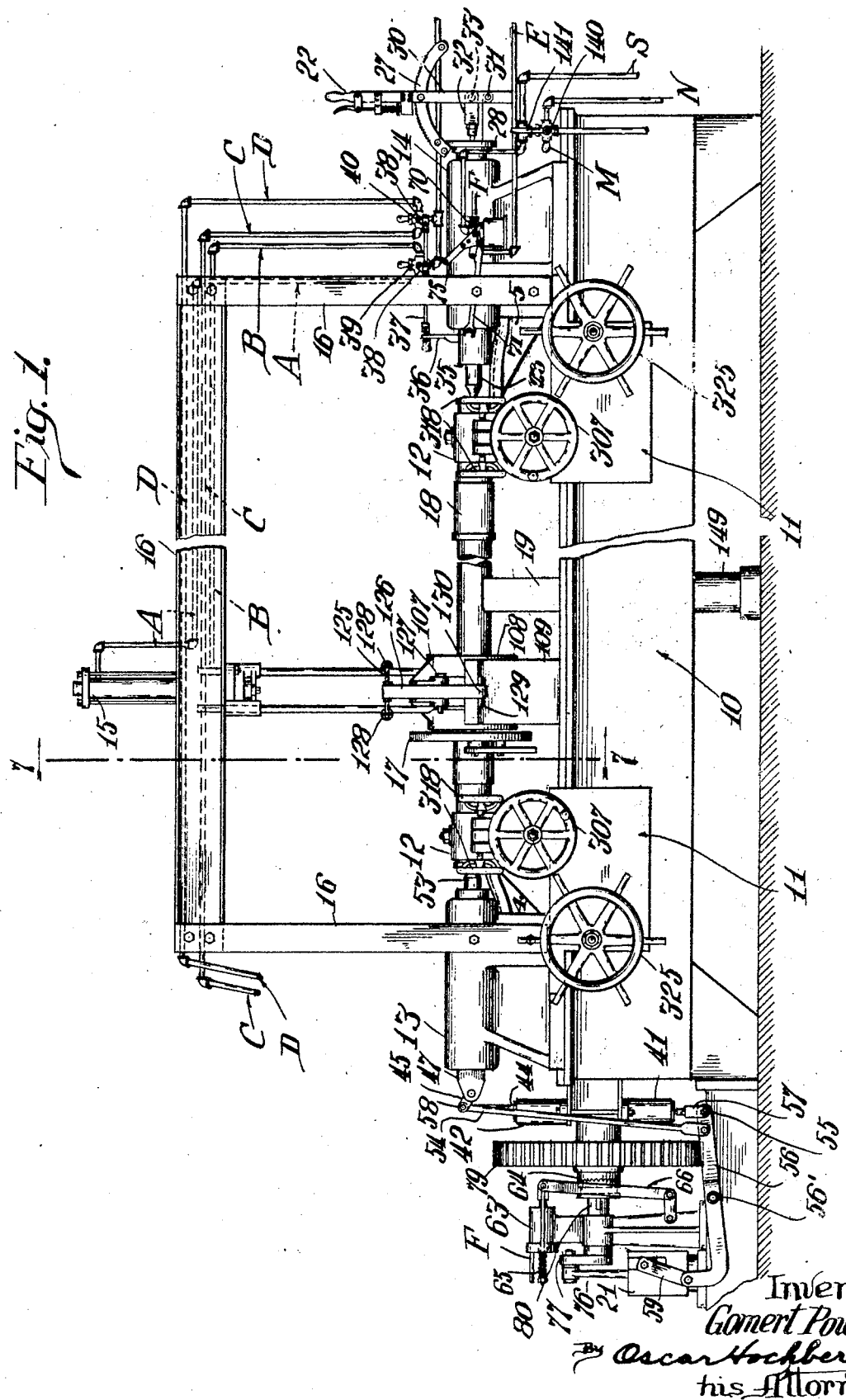

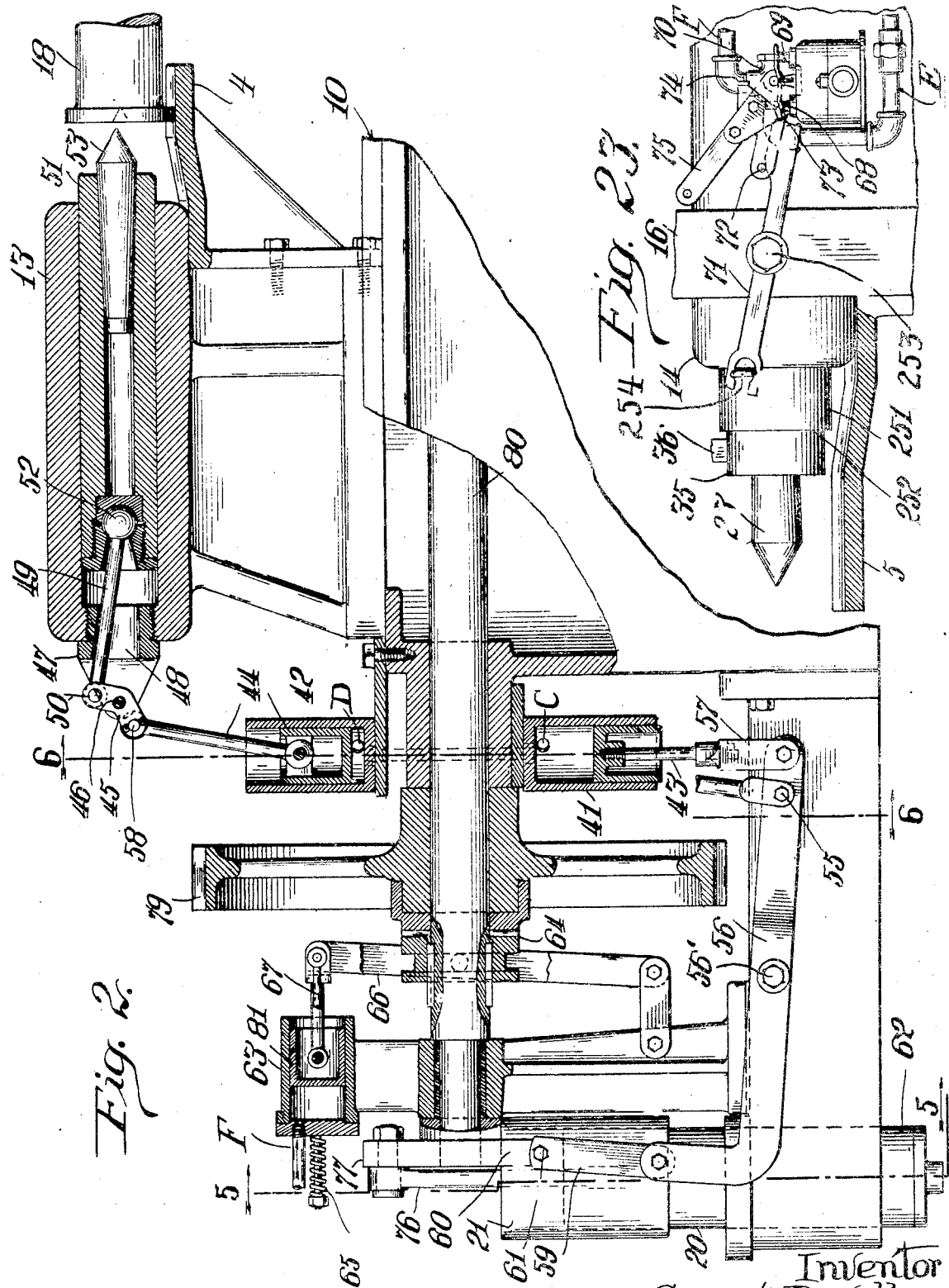

June 7, 1932.  G. POWELL  1,862,516
AXLE BURNISHING MACHINE
Filed June 27, 1929  14 Sheets-Sheet 4
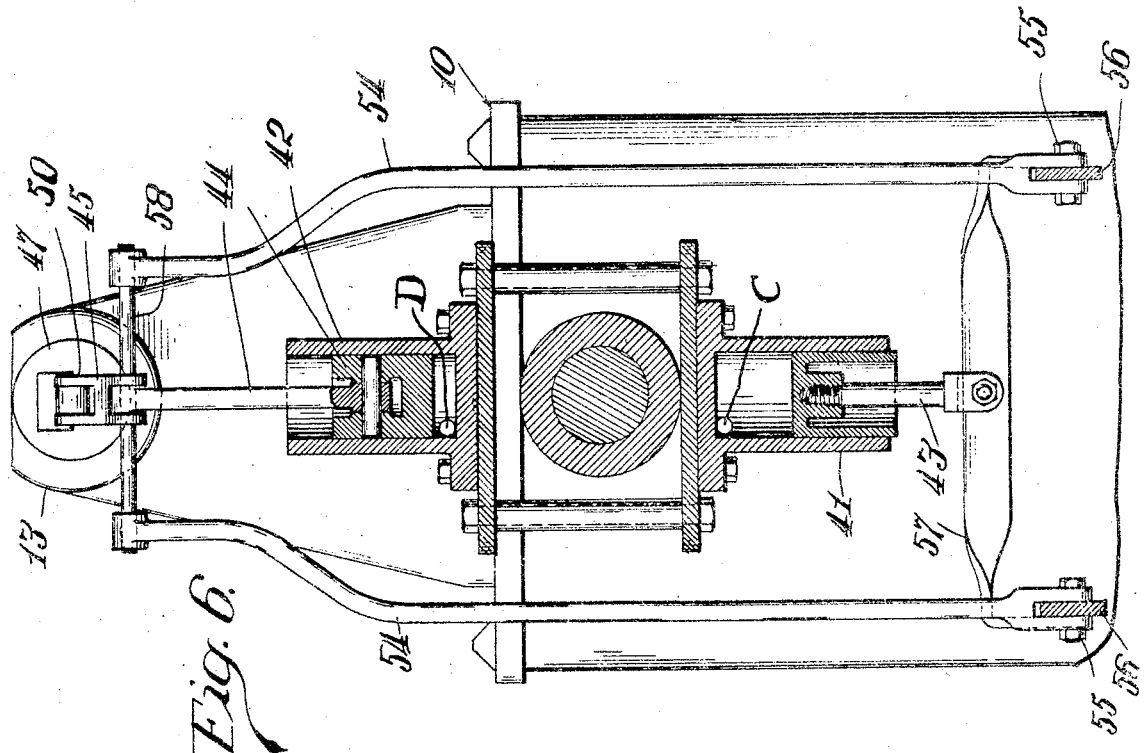
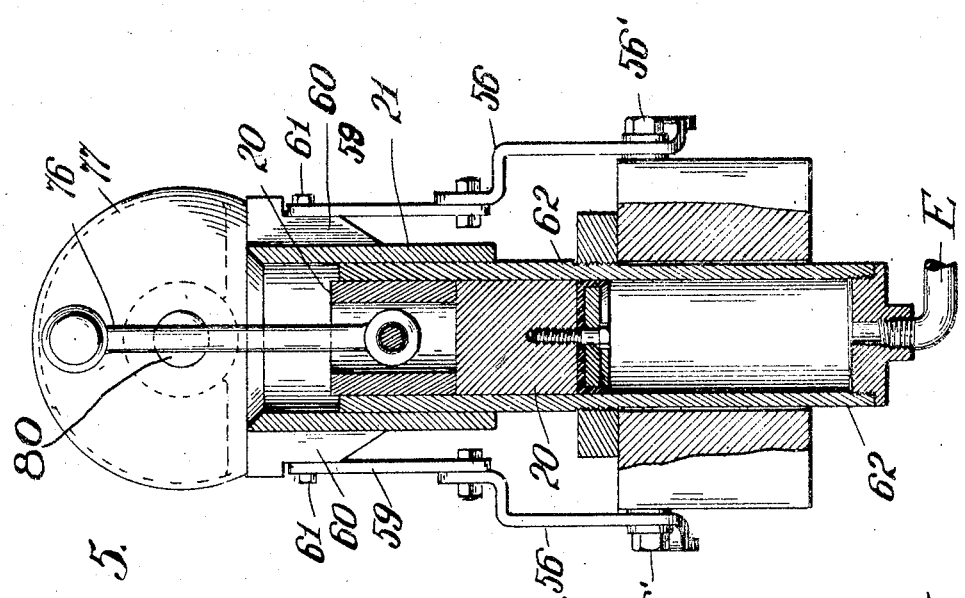
Inventor
Gomert Powell
By Oscar Hochberg.
his Attorney.

June 7, 1932. G. POWELL 1,862,516
AXLE BURNISHING MACHINE
Filed June 27, 1929 14 Sheets-Sheet 5

Inventor
Gomert Powell
By Oscar Hochberg.
his Attorney.

June 7, 1932. G. POWELL 1,862,516
AXLE BURNISHING MACHINE
Filed June 27, 1929 14 Sheets-Sheet 6
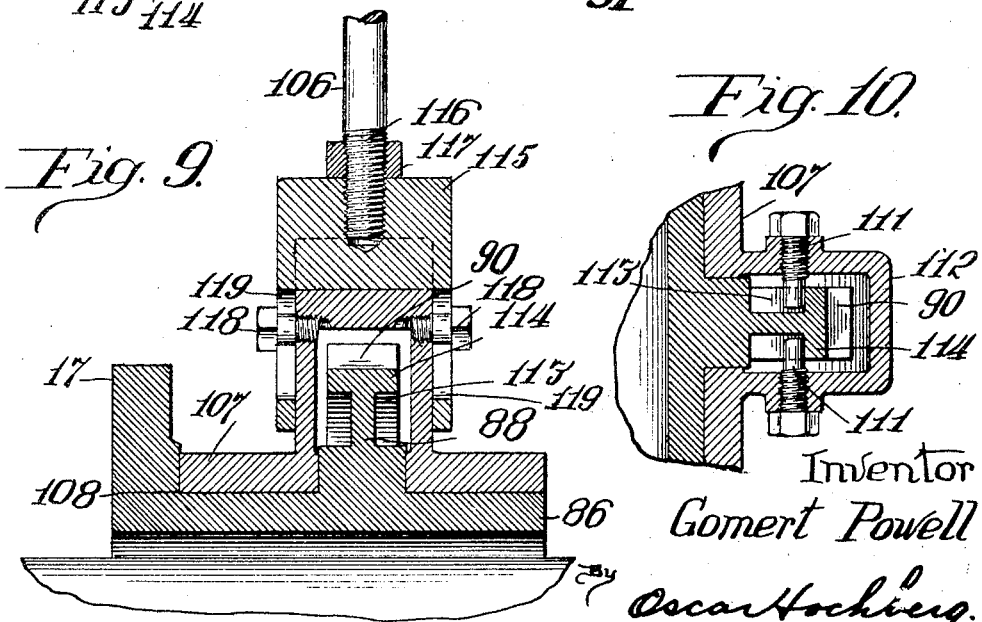

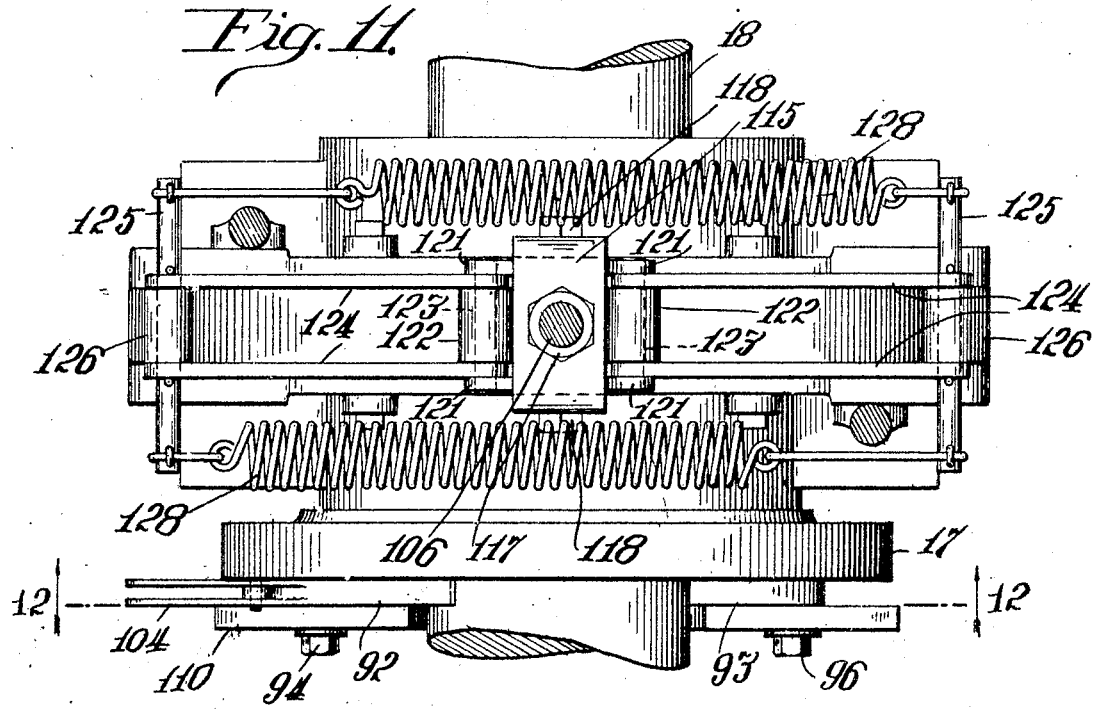
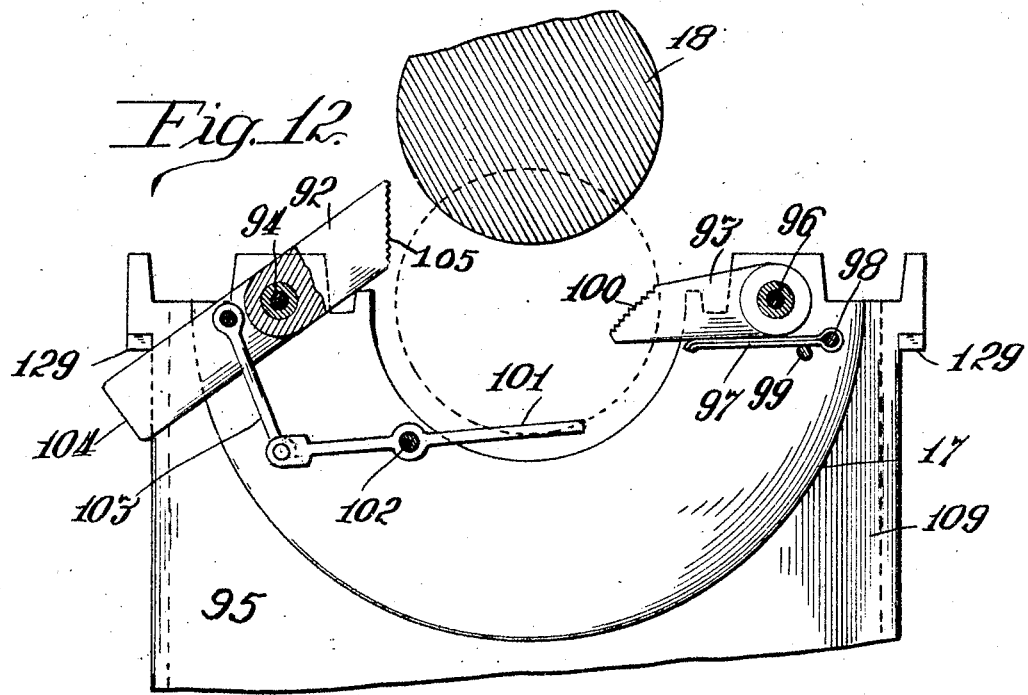

June 7, 1932. G. POWELL 1,862,516
AXLE BURNISHING MACHINE
Filed June 27, 1929 14 Sheets-Sheet 8
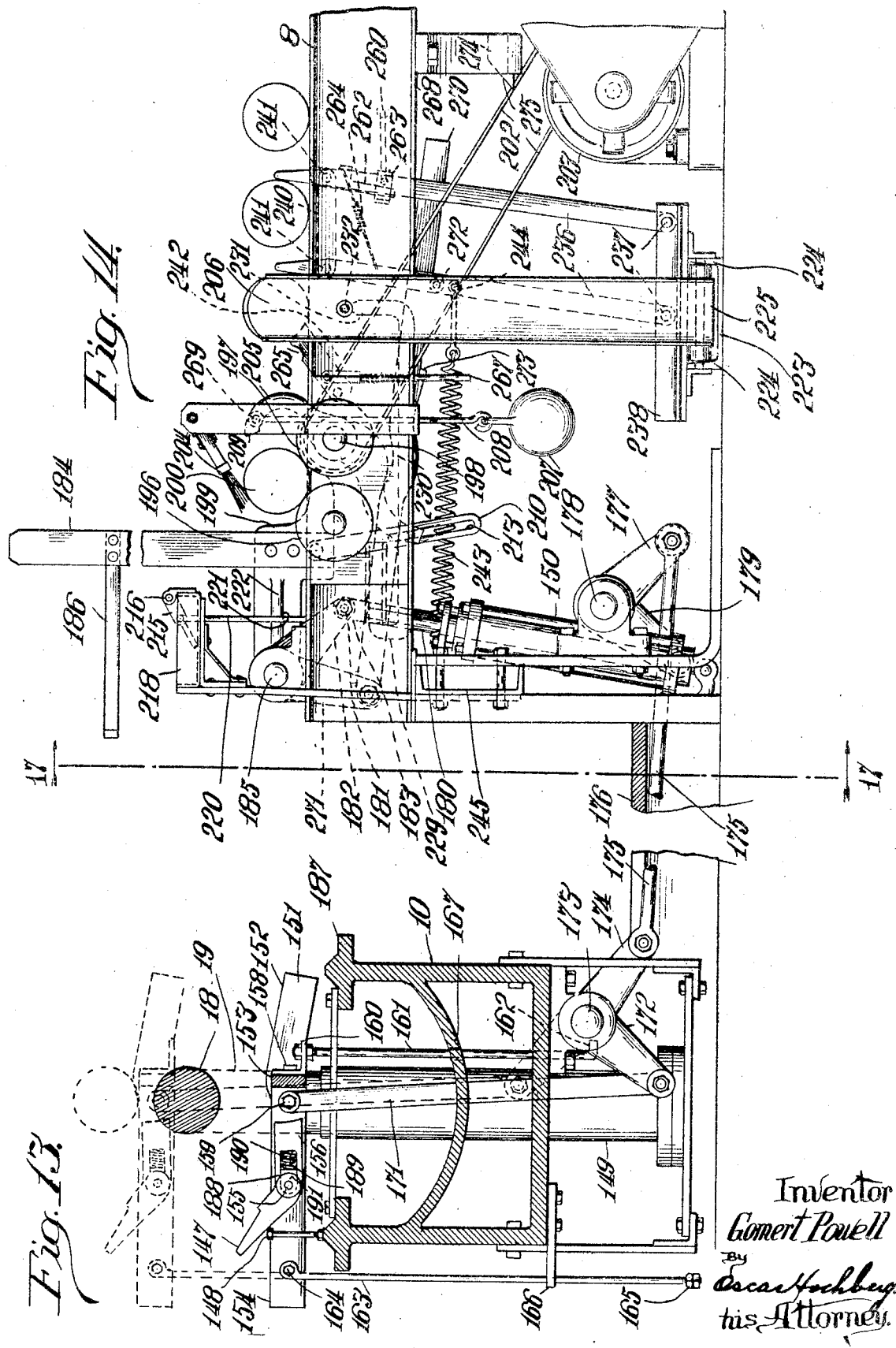
Inventor
Gomert Powell
By Oscar Hochberg
his Attorney

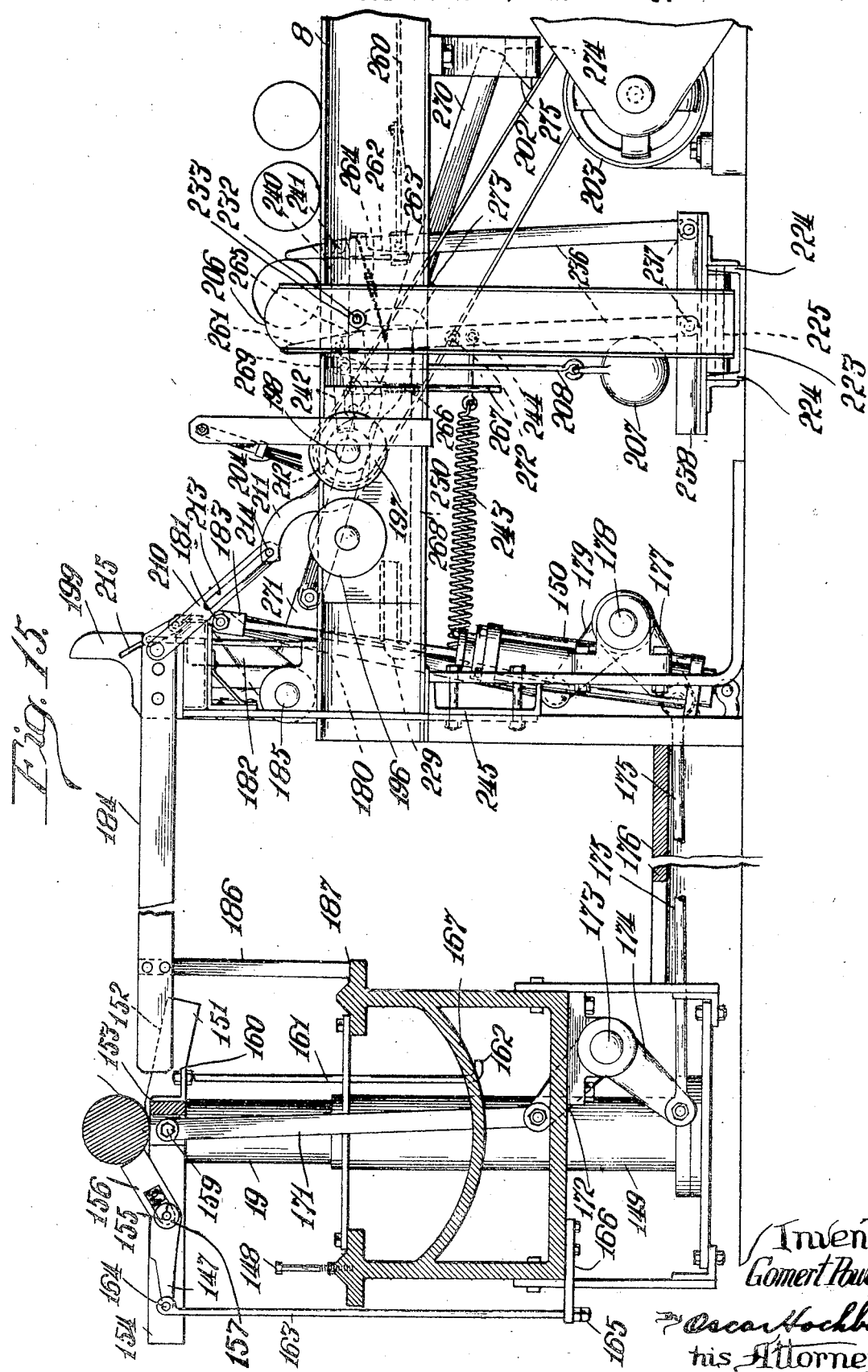

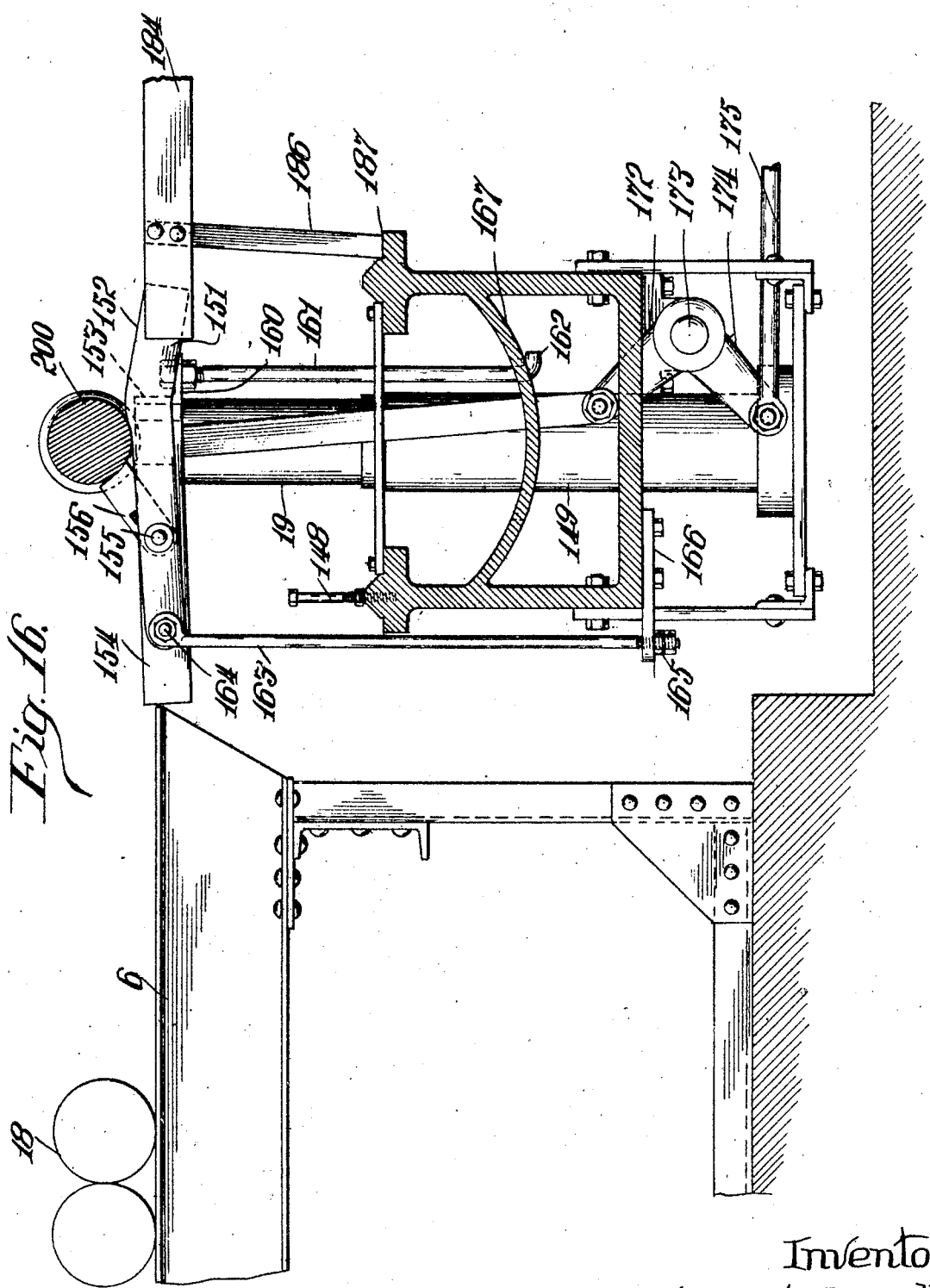

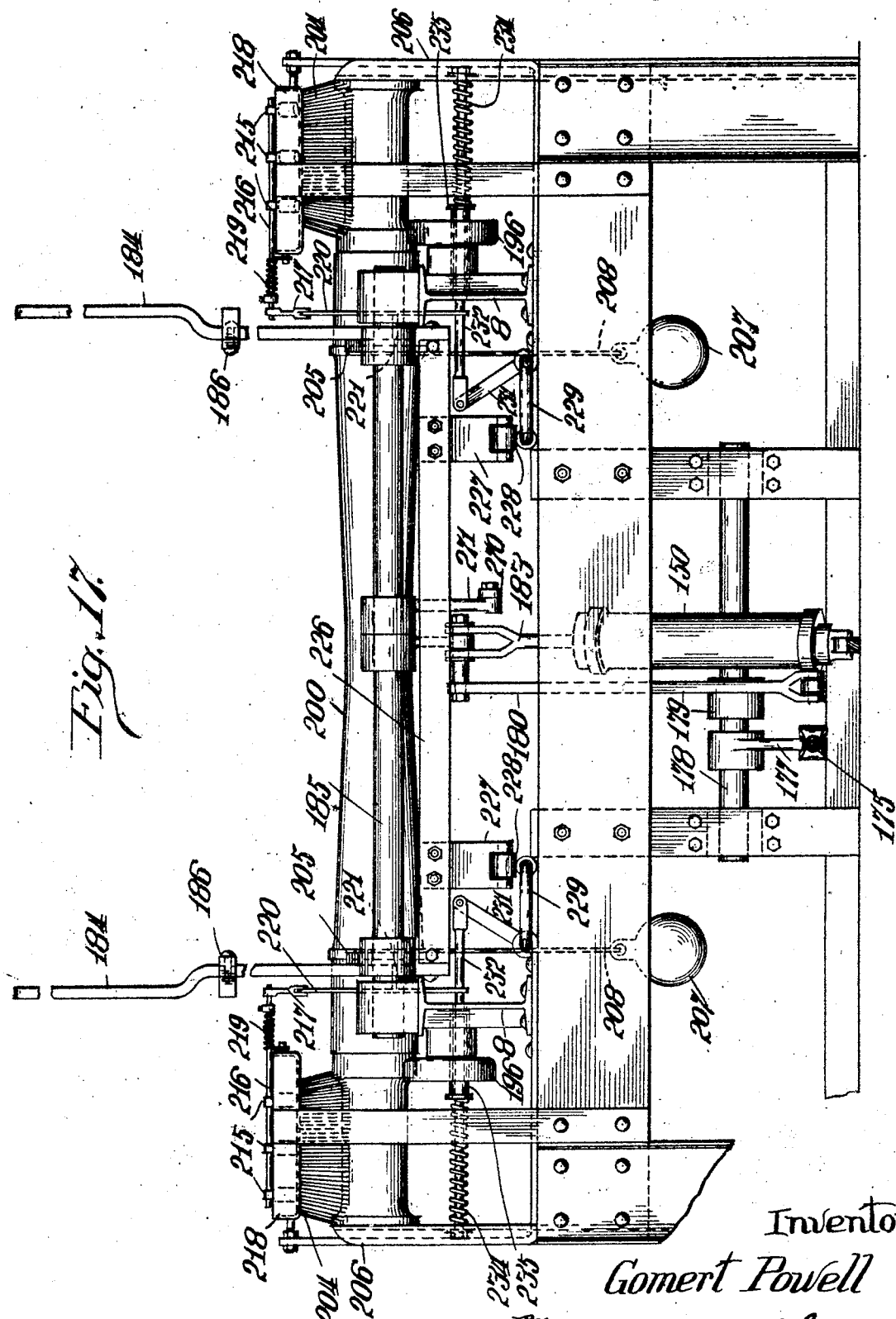

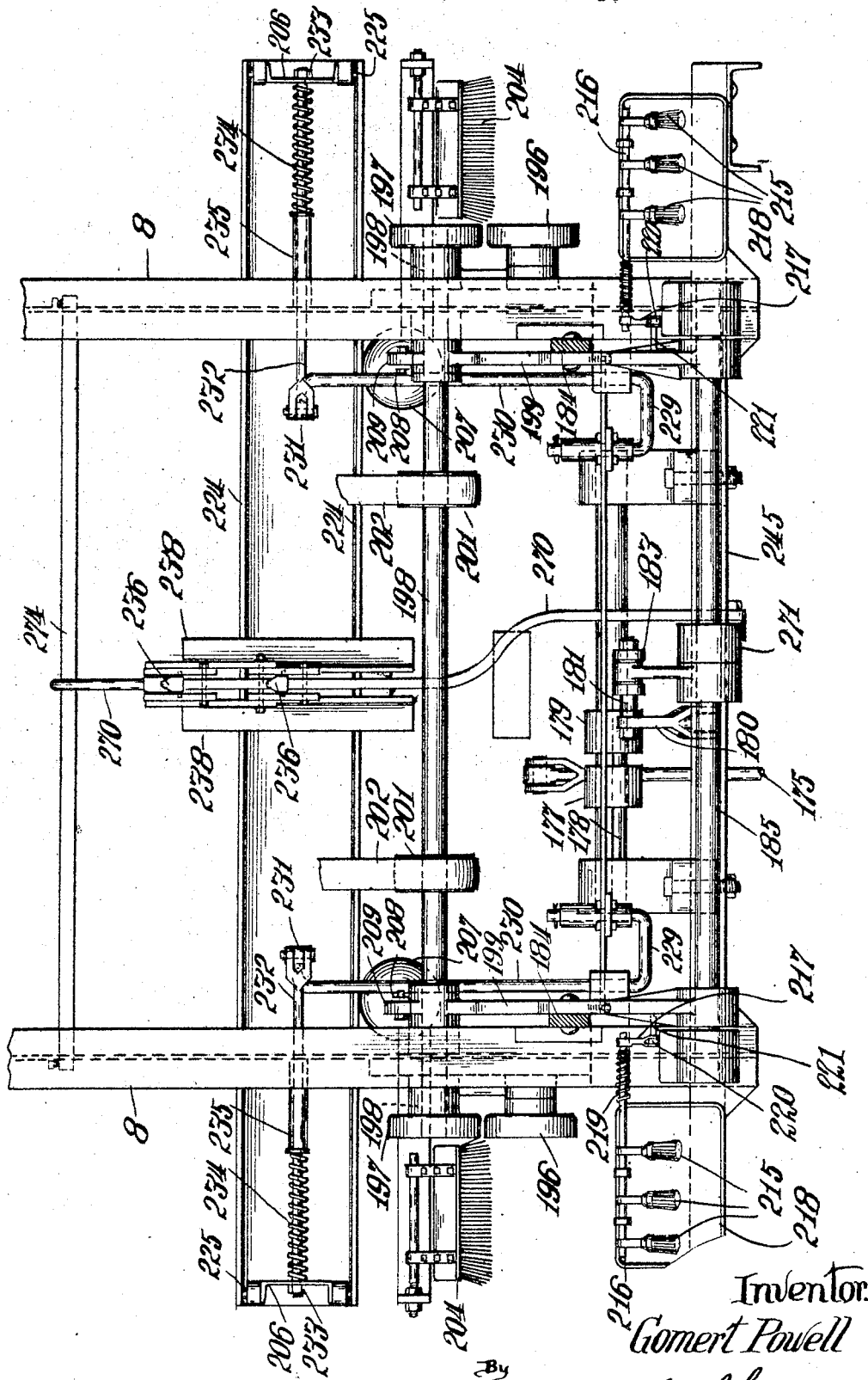

June 7, 1932.  G. POWELL  1,862,516
AXLE BURNISHING MACHINE
Filed June 27, 1929   14 Sheets-Sheet 13
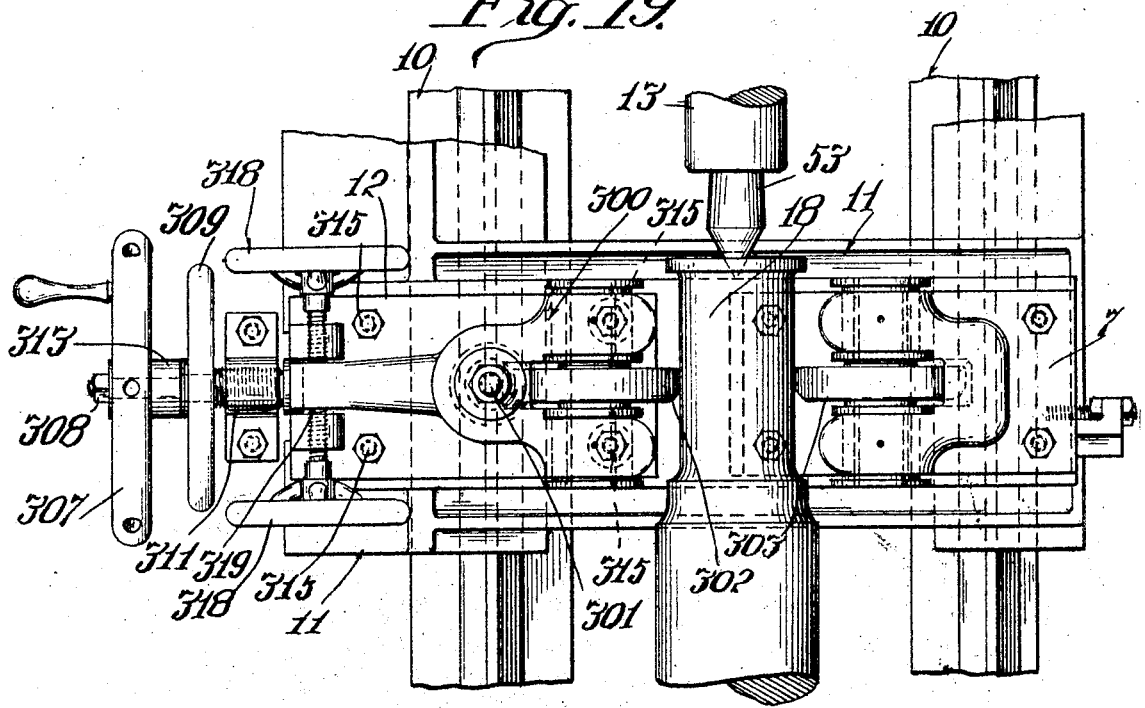
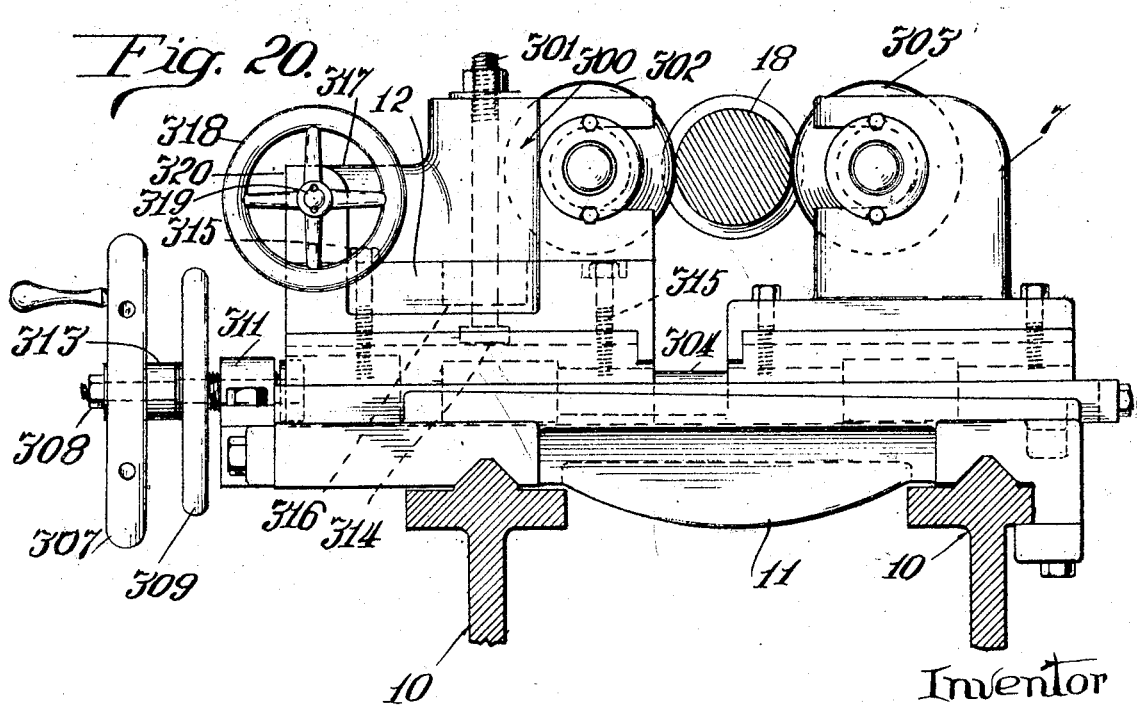
Inventor
Gomert Powell
By Oscar Hochberg.
his Attorney.

June 7, 1932.  G. POWELL  1,862,516
AXLE BURNISHING MACHINE
Filed June 27, 1929  14 Sheets-Sheet 14

Inventor
Gomert Powell
By Oscar Hochberg
his Attorney

Patented June 7, 1932

1,862,516

UNITED STATES PATENT OFFICE

GOMERT POWELL, OF MICHIGAN CITY, INDIANA, ASSIGNOR, BY MESNE ASSIGNMENTS, TO PULLMAN CAR & MANUFACTURING CORPORATION, A CORPORATION OF DELAWARE

AXLE BURNISHING MACHINE

Application filed June 27, 1929. Serial No. 374,156.

The invention relates generally to mechanism for burnishing or otherwise finishing car axles and the like and has particular reference to mechanism for automatically mounting the work upon a lathe and removing it after the finishing operation.

More specifically, the invention contemplates the successive steps involving the automatic feeding of the work to a transferring platform for transferring the work to an associated lathe, centering the work upon the lathe, and discharging it therefrom.

The principal object of the invention is to expedite production by the use of automatic mechanism manually controlled, and to improve the finish of the product.

A further object is to provide simple mechanism for controlling the cycle of operations, and with a minimum of effort and expense.

The foregoing and other objects are attained by the mechanism illustrated in the accompanying drawings in which—

Fig. 1 is an elevational view of a burnishing lathe equipped with the tail stock, axle drive, and operating control mechanism of the invention;

Fig. 2 is a similar view enlarged, partly in section, showing the air operated axle drive centering mechanism, clutch, and tail stock operating elements of the invention;

Figs. 3 and 4 show the improved quick-acting tail stock mechanism and operating lever in side and end elevations, portions of the tail stock being broken away to expose interior mechanism, the operative and released positions being indicated in full and dotted lines, respectively;

Fig. 5 is a vertical sectional view taken on line 5—5, Fig. 2, looking in the direction indicated by the arrows, showing the cam mechanism for centering the divided axle drive hereinafter described;

Fig. 6 is a similar view taken on line 6—6, of Fig. 2, looking in the direction indicated by the arrows, showing the air mechanism for operating the tail stock;

Fig. 8 is a similar view of the divided axle drive enlarged, showing the locking mechanism released and the upper section of the drive raised from the fixed companion bottom section;

Fig. 9 is an enlarged vertical section taken on line 9—9, of Fig. 7, looking in the direction indicated by the arrows, showing the relation of the locking yoke and the upper gear housing when the axle drive sections are locked together as in Fig. 7;

Fig. 10 is a sectional view enlarged, taken on line 10—10, Fig. 8, showing the method of supporting the gear segment by pairs of oppositely disposed retaining screws located on opposite sides of the transverse center of the upper gear housing;

Fig. 11 is a horizontal section through the supporting air hoist rod and the pair of diagonally disposed guide rods projecting upwardly from the upper gear housing, taken on line 11—11, of Fig. 7, looking in the direction indicated by the arrows, and showing the relation of the locking yoke, unlocking springs, guide rods, and locking hooks;

Fig. 12 is a side elevational view of the lower gear housing taken on line 12—12, of Fig. 11, looking in the direction indicated by the arrows, with the segmental tie plate removed to show the method of mounting the axle driving pawls;

Fig. 13 is a vertical section through the lathe bed showing the air jack used in adjusting the work to the lathe, and the operating connections with associated feeding mechanism;

Fig. 14 is an elevational view of the feeding mechanism of the invention showing the work transferring platform raised, the axle swabbing and brushing mechanisms, and the axle centering clamps;

Fig. 15 is a view similar to Figs. 13 and 14, but showing the air-jack raised to receive work from the lowered transferring platform of the feeding mechanism;

Fig. 16 is a view similar to Fig. 13, but showing the air-jack raised to bridge the space between the lowered transferring platform of the feeding mechanism and the work receiving platform;

Fig. 17 is an end elevational view of the feeding mechanism taken on line 17—17, of Fig. 14, showing the disposition of the transferring platform operating mechanism and air-jack connections;

Fig. 18 is a plan view showing the feeding mechanism equipped with the axle-centering clamps of the invention, together with the upright pivoted bars for feeding the axles to the centering clamps;

Fig. 19 is a plan view of the axle burnishing-roll carriage mounted upon the lathe bed, showing the improved adjustable roller mechanism of the invention;

Fig. 20 is a side elevational view of the same;

Fig. 23 is an elevational view of the electric switch lever mechanism and safety lock lever assembly indicated in Fig. 22.

Figure 7:
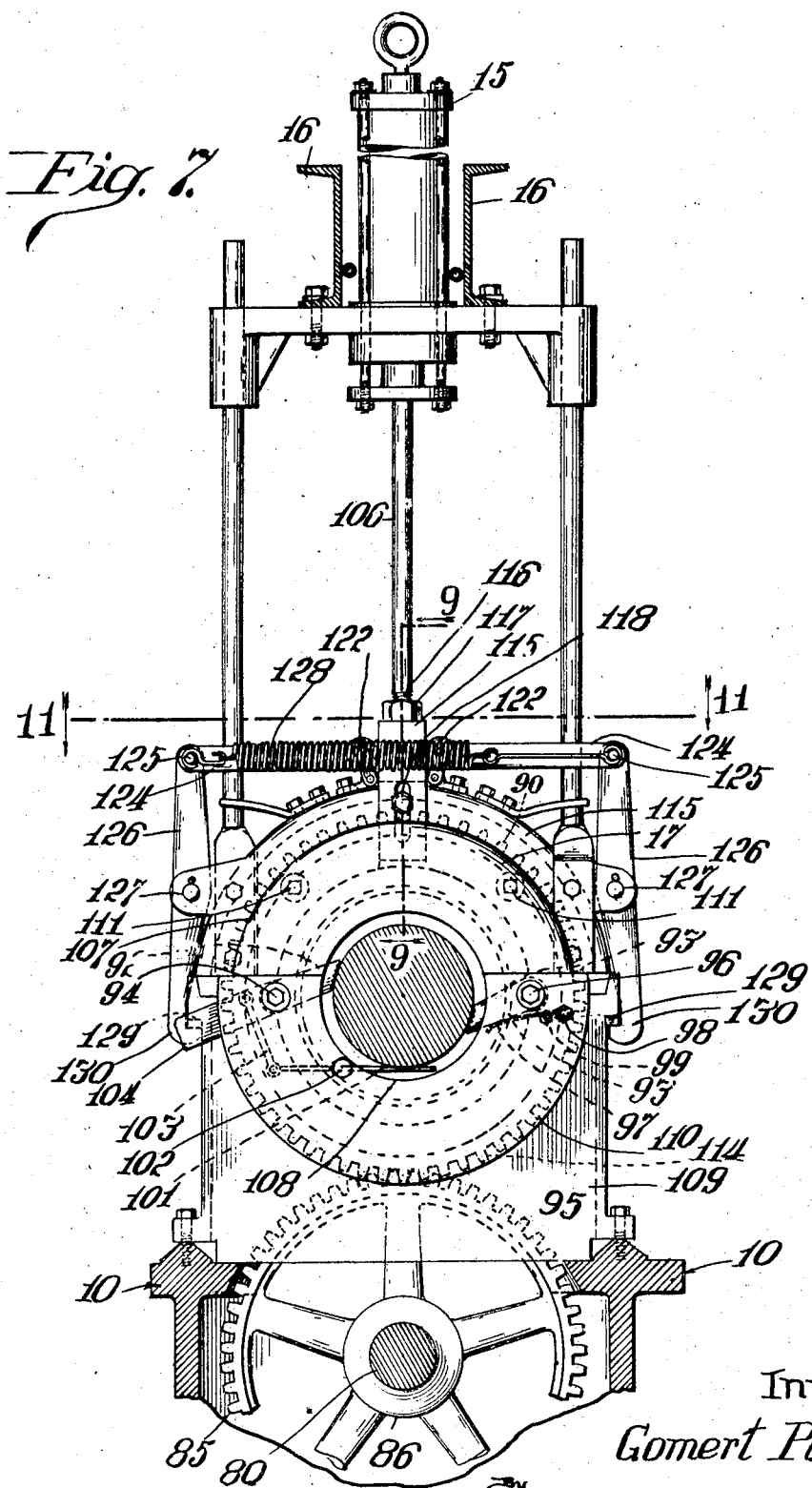
Fig. 7 is a vertical section through the lathe and super-structure taken on line 7—7, of Fig. 1, showing the divided axle drive of the invention and associated locking and supporting mechanism.

In said drawings, 10 represents the lathe bed, and 11 the slides supporting the burnishing roller carriages 7 and 12. Supported at opposite ends of the lathe bed 10 are the tail stocks for centering the work, one of them, 13, being air operated and the other, 14, manually controlled, by mechanism hereinafter to be described. An air-hoist 15 is mounted upon a supporting super-structure 16 and operatively connected with the axle-drive 17 positioned at one side of the transverse center of axle 18 as best shown in Fig. 1. Attached to the lathe bed 10 adjacent the axle-drive and intermediate the ends of the axle 18 is an air-jack 19, best shown in Figs. 13, 15, and 16, designed to lower the axles for centering in the lathe and to raise them to a height from which they are discharged from the lathe position and transferred to a receiving platform.

The tail-stock 13 is operatively connected with cam plunger 20, having air-line communication with controlling mechanism at the opposite end of the lathe adjacent the tail stock 14, and with cam locking block 21. The tail-stocks 13 and 14 and air-hoist 15 are successively operable by control lever 22 best shown in Figs. 3 and 4. The lever is directly connected to the center supporting spindle 35 in tail-stock 14 by rod 24 having universal joint connection with the center by means of the ball and socket joint 25 best indicated in Fig. 3 wherein the lever 22 is shown mounted to fulcrum in a frame 26 including a segmental rack portion 27 secured at one end to an adjustable tail-stock head 28 threaded into the tail-stock 14 for quick adjustment of the center 23 as will hereinafter appear. The head 28 is further provided with a bracket 29 upon which the lever 22 is fulcrumed and frame 26 supported. The rack segment 27 is braced at an intermediate point by the frame post 30 held to the bracket 29 by pin 31 forming the fulcrum for the lever 22 in the operation of the tail-stock assembly. Center rod 24 is fitted with a jaw 32 having pin connection 33 with lever 22 for quickly withdrawing or thrusting forward the center 23 to release or engage the axle 18. The tail-stock is tapped at 34 to receive the head 28 for a finer adjustment of center 23 with respect to the axle 18 by the rotation of head 28 about its axis to cause the frame 26, connecting rod 24, center 23, and lever fulcrum 31 to move axially to and from the work as the head 28 is rotated in one direction or the other to apply or withdraw the center 23 to supplement the major movements of the lever 22 in the operation of the tail-stock.

The spindle 35 of tail-stock 14 carries upon its protruding end a post 36 perforated to receive valve rod 37 having pivotal connection with valve handles 38 of a pair of four-way valves 39 and 40 operable simultaneously in response to the movements of the tail-stock spindle 35 when actuated by lever 22 as before described. The valve 39 has air connection through lines A and B with air-hoist 15 for manipulating the sectional axle-drive mechanism illustrated in Figs. 7 to 12 inclusive, and hereinafter to be described, while valve 40 controls the operation of the air-operated tail-stock 13 through lines C and D as best shown in Fig. 1. Thus arranged, the tail-stocks 13 and 14, and the axle-drive mechanism through air-hoist 15, are all controlled by lever 22 which moves away from the machine to disengage the parts and towards it to operatively connect them.

The air-operated tail-stock 13 is controlled by lever 22 through valve 40 and air-lines C D connecting respectively with the single-acting lower and upper cylinders 41 and 42 having plungers 43 and 44 connected to bent lever 45 fulcrumed on pin 46 in tail-stock head 47 tapped into the tail-stock housing as best shown in Fig. 2. The tail-stock head 47 has a flared opening 48 through which extends a rod 49 connected to the bent lever 45 by pin 50 and coupled to the center spindle 51 by ball and socket joint 52; with the rod universally coupled to the spindle as described it is free to move up and down in response to the action of the bent lever 45 regardless of the possible creeping of the spindle about its axis and without interfering with the longitudinal movement of the spindle with its center 53 to engage the work or to cause its withdrawal to release, as will be obvious.

The bent lever 45 is connected to plunger 43 of the lower cylinder 41 by links 54 secured by pins 55 to rocker-bars 56 having their adjacent ends respectively secured to cross-head 57 on plunger 43 of the lower cylinder as shown in Figs. 1, 2 and 6 of the drawings; as indicated in these figures, links 54 are connected to the bent lever 45 by cross-rod 58 designed to space the links apart to clear the plunger cylinders 41 and 42 as best shown in Fig. 6.

The rocker bars 56 are fulcrumed to base 9 at an intermediate point 56′ and extend therebeyond for connection to cam locking block 21 as shown in Figs. 1, 2, and 5. The free ends of the rocker bars 56 are pivotally connected to thrust bars 59 secured to and supporting the cam locking block 21. The thrust bars 59 are pivotally held to laterally extending wings 60 of cam block 21 by means of bolts 61 tapped into the wing sides as indicated. The block 21 is preferably cylindrical in form and mounted for telescopic engagement with the outer surface of air cylinder 62 fixed to base 9. The cylinder 62 communicates with airline E connected to four-way valve 70 at the opposite end of the lathe and is designed to effect the positioning of the split gear axle drive mechanism 17 shown in Figs. 7 to 11 inclusive, and is controlled by lever 75 on valve 70. The lever 75 is provided at its base with arms 72, 73 and 74, adapted to operate safety lock arm 71 of the locking mechanism to be hereinafter described, to permit manipulation of tail-stock center 23 and to start and stop the driving motor through electric switch buttons 68 and 69 engaged successively by arms 73 and 74, by shifting the position of the lever from the left, as shown in Figs. 1 and 23, to the right.

During such movement of the lever 75, valve 70 is operated to exhaust the air from clutch operating cylinder 63 through air-line F to release clutch 64 by the expansion of release spring 65 secured to clutch-arm 66 through connection rods 67 on opposite sides of cylinder 63, and to simultaneously introduce air to split-gear positioning cylinder 62 through air-line E to operate cam plunger 20 connected by arm 76 to cam 77 fixed to axle-drive shaft 80 upon which the driving gear 79 is rotatably mounted. Gear 79 meshes with a pinion on the driving motor (not shown) and rotates idly upon the shaft 80 until engaged by clutch 64 through the operation of plunger 81 in cylinder 63 when air is admitted through air-line F.

Upon shaft 80 is mounted a supplementary gear 85, best shown in Fig. 7 adapted for meshing engagement with a split gear 90 positioned immediately above it and operatively held within a divided housing 95 illustrated in Figs. 7 to 12 inclusive. The split-gear 90 is divided at its axial center and comprises upper and lower segments 88 and 89 respectively, having their meeting edges 87 formed with their mutually engaging surfaces accurately fitted to prevent edgewise displacement of the segments and to insure operating precision since the segments must function as a unit to transmit the driving energy of gear 85 to the axle 18. The segments are formed with hub portions 86 having their respective meeting edges 87 rabbeted in overlapping planes as indicated at 91, Fig. 8, and complement each other in providing a unitary gear element when held in operative relation by a locking mechanism to be described.

The hub segments are formed with disc portions 17 to the lower of which is secured a pair of axle driving pawls 92 and 93 pivotally mounted on pins 94 and 96 respectively and designed to automatically engage the axle 18 as the axle is lowered into position between them as clearly shown in Fig. 12. As axle descends, it first engages pawl 93 yieldingly held in the path of the axle by pressure spring 97 anchored on pin 98 and held in pawl supporting position by pin 99. The spring will yield under the weight of the axle and oppose continued downward movement thereof by a constantly increasing spring pressure until the axle has reached its limit of movement when the spring pressure exerted against the pawl will be sufficient to insure driving contact between the roughened end 100 of the pawl and axle.

The pawl 92 will subsequently engage the axle and become automatically operative as the axle is brought to its resting position in the drive. The pawl is weighted and normally out of the path of the axle and is actuated only when the axle presses lever 101 fulcrumed on the disc on pin 102. The lever is connected to pawl 92 by link 103 and lifts the weighted end 104 of the pawl when depressed by the axle to cause the roughened end 105 of the pawl to engage the axle with a driving pressure. To house and protect the pawl mechanism a segmental disc plate 110 is secured to the gear disc 17 by pins 94 and 96 forming the supporting pivots for the pawls 92 and 93.

As best shown in Figs. 7 to 10 inclusive, the split gear is rotatably supported in housing 109 having a bearing 108 for the segmental gear hub portions 86. The housing is divided to accord with the division in the contained split gear 90, the upper portion 107 being removable and adapted to support one of the gear segments 88 when raised by air-hoist 15 upon outward movement of hand lever 22, controlling valves 39 and 40 having air-line connection respectively, with air-hoist and tail-stock 13, as before noted. For this purpose, the upper housing 107 is fitted with a pair of screw studs 111 entered in opposite sides of contracted portion 112 of the gear housing and projecting inwardly towards the gear segment 88 with which they engage to support the segment when the upper housing 107 of the air-hoist is raised. The gear segment 88 is formed with annular grooves 113 immediately beneath the peripheral rim 114 arranged to receive studs 111, the segment being held in position with the underside of rim 114 in supporting engagement with the studs, as shown in Figs. 7, 8, and 10. The upper housing 107, with its contained gear segment 88 is connected with air-hoist 15 by piston rod 106 and associated wedge block and crosshead 115. The wedge block is tapped in its upper side to receive the threaded end 116 of the piston rod and held rigidly by nut 117 as shown in these figures and Fig. 11. The block is secured to portion 112 of the upper housing 107 by screw studs 118 extending through slots 119 of the block 115 and tapped into the housing, permitting initial vertical movement of the block to manipulate locking mechanism designed to connect the upper and lower portions of the gear housing and through them the segments of gear 90 during the operating periods of the machine.

The locking and unlocking is effected by means of the wedge 120 formed in the underface of the block immediately above the level of slots 119 in a manner presently to appear. Pivotally mounted on the exterior of the upper housing 107 and on opposite sides of and adjacent the wedge block 115, on links 121 are rollers 122 adapted to ride upon the wedge faces 120 during the operating movements of the locking mechanism. The rollers are each journaled on shafts 123 which serve as trunnions for a pair of thrust links 124 having their opposite ends pivotally connected to cross-rods 125 extending through contiguous upper ends of upright locking bars 126 fulcrumed between their ends to the upper housing 107 by pins 127, as best shown in Figs. 7, 8, and 11. The rollers are held normally in contact with the wedge block 115 under pressure of coil springs 128 extending between and connecting cross-rods 125 on the locking bars 126.

During the operating periods of the machine the rollers are held apart as indicated in Fig. 7 with the thrust bars 124 holding the upper ends of locking bars 126 apart and their lower hook portions 130 in engagement with shoulders 129 on the fixed housing portion 109. The locking is effected by the thrust of the wedge faces 120 against abutting rollers as the piston 106 with its wedge block descends under pressure of the air in air-hoist cylinder from air-line A when control lever 22 is moved towards the center of the machine, or inwardly.

Upon outward movement of the lever 22, the air above the piston 106 in the air-hoist cylinder is exhausted through air-line A and air admitted to the lower end of the cylinder beneath the piston through pressure line B, to cause initial upward movement of the wedge block 115 and incidental retraction of wedge faces 120 to allow the rollers 122 to approach each other under the contractile force of springs 128 and cause locking bars 126 to rock on their fulcra 127 and withdraw hooks 130 from engagement with respectively adjacent shoulders 129 on the fixed housing to release upper housing 107 and contained gear segment to permit subsequent raising thereof upon continued upward movement of piston 106.

The axle 18 to be operated upon is lowered to and raised from the lathe by an air-jack 19 best shown in Figs. 13 to 16 inclusive. The jack is positioned adjacent the split gear housing 109 as indicated in Fig. 1 and is operated by four-way valve 140 controlled by lever 141 regulating air-line M feeding the single acting cylinder 149 of the air-jack and bottom of an auxiliary cylinder 150 operating an associated axle feeding mechanism hereinafter described, and air-line N to the upper side of auxiliary cylinder as will presently appear. As indicated in Fig. 13 the axle 18 in full lines shows the position of the axle between the lathe centers and the broken line representation of the axle indicates its raised position after the finishing operation. The air-jack cylinder 149 is mounted on lathe bed 10 and carries plunger 19 supporting a tiltable skid frame comprising a pair of axle runway bars 151 having sloping ends 152 held apart and connected by crossbar 153 having its end portions bent to form legs 154 designed to parallel adjacent bars 151.

The bars are secured together by through rod 155 pivotally supporting a pair of shock-absorbing axle stops 156 and supporting a spring 157 coiled about the rod to frictionally engage axle stops 156 to hold them in axle engaging position shown in Figs. 15 and 16. The skid frame is supported from crossbar 153 the mediate portion of which is secured by bolts 158 connecting the air-jack plunger head and anchor clip 160 on the opposite side of the crossbar as shown in Figs. 13 and 15. The anchor clip supports a depending stop rod 161 formed at its lower end to provide a head 162 designed to engage a part 167 on the lathe bed 10 to limit the rise of adjacent side of the frame. For a similar purpose stop rods 163 are suspended from the opposite side of the skid frame by pins 164 taking legs 154 of the crossbar and bars 151 and provided with stop heads 165 designed to engage a part 166 on the lathe bed prior to contact between stop 162 of rod 161 and part 167 of the lathe bed to permit tilting of the skid frame upon fulcrum pins 164 upon continued upward movement of the air-jack plunger 19 and impart a slight jarring impulse to the axle 18 when raised to discharge from the lathe after a finishing operation as indicated in broken lines in Fig. 13.

The movements of the air-jack plunger 19 are synchronized with the piston rod 183 of auxiliary cylinder 150 by toggle link and crank arm connections 171 and 172, respectively, connected in pairs adjacent the air-jack, the crank-arms 172 being mounted on driven shaft 173 journaled in the lathe bed, and an intermediate operating crank-arm 174 pivotally connected with transmission rod 175 extending beneath the floor 176 for connection with link and crank-arm mechanism adjacent auxiliary cylinder 150 as shown in Figs. 13 to 18 inclusive.

The transmission rod pivotally connects with crank-arm 177 fixed to driving shaft 178 journaled adjacent the auxiliary cylinder and through the medium of this shaft to a second crank-arm 179 having direct connection with upwardly extending rod 180 pivotally secured to a wrist pin 181 connecting a third crank-arm 182 and piston 183 of auxiliary cylinder 150. Crank-arm 182 is fixed to shaft 185 operating the movable platform 184 bridging the space between the skid frame bars 151 on the air-jack plunger 19 and an axle feeding device hereinafter described and as best shown in Figs. 13, 14 and 15. As the air-jack plunger rises to discharge the finished axle as shown in Fig. 13, the platform 184 drops to deliver another axle 18 as shown in Figs. 15 and 16.

The platform is provided with supporting standards 186 fixed to its underside in position to engage a ledge portion 187 on the carriage slides 11 of the lathe bed to support the platform at the level of skid frame bars 151 on the air-jack to provide continuous runway for axles to be delivered to the lathe. The shock-absorbing axle dogs 156 before noted provide cushioned buffers to impact of the axles fed to the lathe and are pivotally and slidably mounted on rod 155 to move against coil spring 190 having one end abutting an end wall of slot 189 in the stop with its opposite end seated upon a follower piece 188 also slidable within the slot and provided with a bearing 191 upon the rod 155 as best shown in Figs. 13 and 15. In the position indicated in Figs. 15 and 16 the axle dogs 156 are stressed by the pressure of the axle bearing against them before it is lowered to the lathe center for finishing.

The dogs have been thus raised to axle stop position by the pressure of the axles previously discharged from the lathe upon the upwardly inclined tail-piece 147 of the dogs 156 as they rolled from the skid frame, thus checking the movement of the next unfinished axle at the lathe position indicated in these figures. After the unfinished axle has been lowered to operative position between the centers as shown in Fig. 13, the skid frame is further lowered out of the operator's way at which time tail 147 of dogs 156 will have engaged studs 148 and restored dogs to their lowered axle releasing position indicated in this figure.

From the foregoing it will be apparent that an unfinished axle is fed to the lathe each time the transferring platform 184 drops to its lowered position on the lathe. The platform 184 rises as the axle is lowered to the lathe center for the finishing operation. As the transferring platform floor rises it permits access to the platform 176 to allow the operator to adjust the burnishing roller mechanism illustrated in Figs. 1 and 19 to 21, and hereinafter to be described. As the platform reaches its full raised position indicated in Figs. 14 and 17, an axle 200 is caused to occupy a position immediately above and in the path of stud post 199 but held out of contact therewith by a pair of rollers 196, an idler, and 197, a driving roller, arranged at opposite sides of the axle skid frame 8 as best shown in Figs. 17 and 18. The driving roller 197 is fixed to shaft 198 carrying a pair of pulleys 201 driven by belts 202 connected to a motor 203. The rollers are of substantial proportions and ruggedly mounted to support the weight of the axle thrust upon and carried by them.

As rollers 197 are rotated, they drive the imposed axle 200 and through it the rollers 196 which function to hold the axle in frictional engagement with the driving rollers 197. The axle thus mounted and rotated is positioned with its rough turned journal portions directly in the path of overlying gravity brushes 204 pivotally mounted above the axle and bearing against the revolving journals to sweep them of all foreign matter as indicated in Figs. 14, 17 and 18 of the drawings.

The axle 200 is thrust upon rollers 196 and 197 by finger levers 205 idly journaled on roller driving shaft 198 and normally held out of the path of axles released from adjacent axle centering clamps 206, and incidentally kept from rotation with driving shaft 198, by counterweights 207 suspended from the levers by rods 208 pivotally secured thereto and depending freely. The finger levers are curved to present their tips 209 for engagement at a point adjacent the horizontal diameters of the axles to insure positive thrusting pressure against the axle sides as they mount the rollers for brushing as shown in Fig. 14. The finger levers are actuated by the axle transferring platform 184, as it is raised and lowered about shaft 185, by respectively adjacent sliding link connection 210 pivotally secured at one end to the platform adjacent the shaft and at its opposite end to lever arm 211 on finger lever hub 212 and having preferably a pivotal sliding engagement with link slot 213 through pin 214 on the lever.

As the platform is lowered from its raised position in Fig. 14 to that indicated in Fig. 15, its stud post 199 lifts the rotating axle 200 from rollers 196 and 197 and into the path of swabbing brushes 215 mounted on rods 216 fitted with crank arms 217 and journaled adjacent one side of a lubricant pan 218. The swabbing brushes are held normally aloft by tension springs 219 coiled about rods 216 and their opposite ends secured respectively to the rods and adjacent pans, the brushes being held immersed in the lubricant in pans 218 and restrained from upward movement by means of rods 220 depending from crank arms 217 and fitted with lateral projections 221 adapted to be engaged by base arm 222 of the platform when occupying its lowermost position shown in Figs. 14 and 17 when platform is raised.

The movements described are reversed as the base arm 222 rises during the lowering of the platform. The swabbing brushes 215, charged with lubricant, enter the orbit of axle 200 as it is lifted from rollers 196—197 on its way to the skid frame on the air-jack. The sliding links 210 are drawn upwardly until pins 214 on lever arms 211 reach lower ends of link slots 213 when the lever hubs 212 will be rotated on shaft 198 to cause respective finger levers 205 to drop below axle skid table 8 out of the path of the released axles in position again to force adjacent axle onto the driving rollers as shown in Fig. 15.

The mechanism for feeding and aligning or centering the axles 200 will now be described. The axles having previously been rough turned, are deposited on axle skid table 8, slightly inclined or sloped, and of sufficient length to hold a production run of them, are permitted to feed by gravity to the aligning or centering clamp channels 206 pivotally mounted at their bases on pins 225 journaled in upright flanges 224 of supporting base channel 223 extending between and connecting the clamp channel bases as shown in Figs. 14, 15 and 18. The clamp channels 206 are moved outwardly to release the axles and to receive them and inwardly to center them with respect to the position they must severally occupy in the lathe between the center spindles 23 and 53.

These movements are communicated by the raising and lowering of the platform 184, to the base tie plate 226 of which, is secured a pair of brackets 227 carrying rollers 228 adapted upon the raising of the platform to engage respectively adjacent crank arms 229 underlying and in the path of said rollers. The crank arms 229 are part of respective rock shafts 230 terminating in relatively upright crank arms 231 having pivotal connection with rods 232 slidably supported in clamp channels 206 and skid table 8 as shown in Figs. 14, 15, 17 and 18. The rods 232 are operatively held to the clamp channels 206 by nuts 233 fitted to ends of the rods to insure positive response to inward movement of the crank arms 231 when the respective rock shafts 230 are rotated by depression of crank arms 229 when engaged by rollers 228 as platform is raised. The rods are also fitted with release springs 234 adapted to urge clamp channels 206 outwardly when crank arms 229 are released upon lowering of the platform.

The springs bear at one end against the web of adjacent clamp channel 206 and at their opposite ends against respectively adjacent sleeves 235 abutting the skid table frame at their remote ends. The axles thus released from between the clamps, make room for yet another axle following close upon it and thrust into position between the clamps by a pair of parallel uprights 236, pivoted in tandem at their bases on pins 237 journaled in brackets 238 supported upon clamp base channel 223, and held spaced apart at their upper ends by connecting bars 240 pivoted to the uprights by pins 241.

The bars 240 may be formed with forward extensions 242 designed for butt-end engagement with side of shaft 198 to check outward sway of the uprights under the force of spring 243 connecting one of the uprights at position 244 to skid table frame member 245, as best shown in Figs. 14 and 15, but the uprights 236 are preferably held from abnormal forward movement by cable 260 secured to one of the uprights and at its opposite end to a fixed anchorage to limit the sweep of the uprights under axle-propelling force of spring 243. It should be noted that in order for the uprights to assume positions behind the axles for the purpose of urging them forward toward the centering channels 206, the upper end portions of the uprights are made collapsible, in one direction of movement only, upon contact with forward side of the axles to enable them to pass underneath, as will presently appear. These ends are formed of trip levers 261 fulcrumed on pins 241 securing bars 240 to the uprights and provided with depending arms 262 abutting stop clips 263 on the uprights.

The ends are held yieldingly upright by springs 264 secured to the respective depending trip arms 262 and their opposite ends to some member of the upright assembly, preferably to connecting bars 240 although one of them may be secured to the forward upright as shown in Figs. 14 and 15. As indicated in Fig. 14 the axles propelled forward by the uprights 236 are checked in their progress at a point between the centering channels 206 by dogs 265, pivotally secured to skid table member 8 and normally held in the path of the axles, by springs 266 coiled about floating connection rods 267. The rods are pivotally secured to dogs 265 and loosely entered in guide openings in the lower flange 268 of adjacent skid frame member 8, the flange providing a convenient seat for the lower end of the spring.

The dogs 265 are depressed against the action of springs 266 by pins 269 on finger levers 205 which engage the dogs to force them below the path of the axles as the levers move to their axle receiving position indicated in Fig. 15, as before noted. As finger levers 205 and dogs 265 move downwardly, the axle clamped between the centering channels 206 is released and urged forward into the path of the underlying finger levers 205 by adjacent upright 236, another axle thrust forward by the rear upright supplanting the released axle in the space between the centering clamp channels 206, that operation being repeated for each succeeding axle as the work progresses. The uprights 236 are restored to their normal thrusting positions behind the respectively adjacent axles by means of a combined locking and release bar 270 pivotally secured at one end to crank arms 271 fixed to shaft 185, and slidably supported on thimble 272 on forward upright 236. Bar 270 is formed with a depending thrust shoulder 273 operatively engageable with thimble 272 as shaft 185 rotates with crank arm 271 during the lowering movement of the platform 184.

As shoulder 273 engages thimble 272 the uprights are forced backward against the power of spring 243 until the collapsible trip levers 261 reach positions to the rear of respectively adjacent axles, upon the consummation of which movement the free end of bar 270 will come into contact with a stationary confronting abutment 274 presenting a bar deflecting face 275 inclined rearwardly and upwardly to cause said bar to be thrown upwardly sufficiently high to permit shoulder 273 to be raised clear of thimble 272 to release uprights 236 for movement under stress of spring 243, as best indicated in Figs. 14 and 15.

Figure 21:
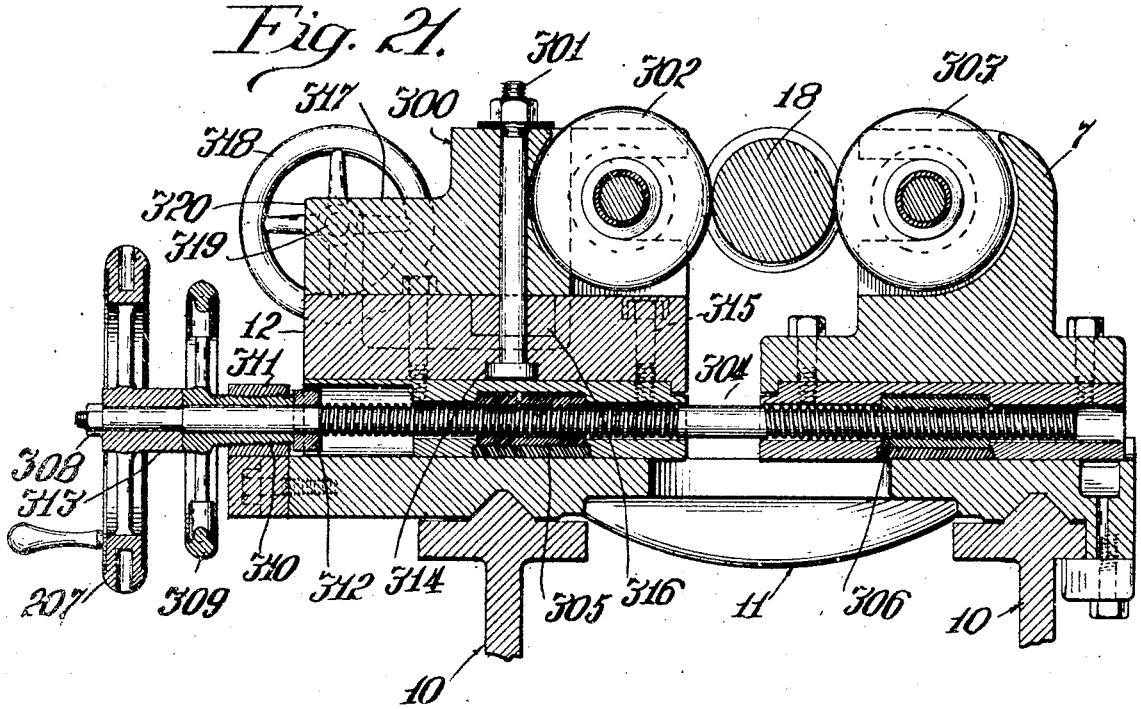
Fig. 21 is a longitudinal vertical sectional view through the carriage showing the right and left hand threaded feed screw and the swivel-base anchorage for the pivotal roller block.

The axle to be operated upon having been duly adjusted between centers 53 and 23 of the lathe by the mechanism and in the manner hereinabove described, the rough turned journal portions thereof are burnished by roll mechanism mounted on slides 11 having roll carriages 12 carrying roll blocks 300 pivotally mounted and anchored by swivel bolts 301 to permit angular adjustment of roll 302 with respect to the axle. A separately mounted and independently operable roll 303 journaled in a companion carriage 7 fixed against rotation but arranged to approach and be withdrawn from the opposite sides of the respectively adjacent journals is also mounted on the slide and with carriage 12 is moved towards and away from the journal by a right and left hand threaded feed screw 304 threaded in bearings 305 and 306 of carriages 12 and 7 respectively as best shown in Fig. 21. The screw is rotatable by hand wheel 307 fixed to the screw at its end and secured by nut 308, and adjustable longitudinally by another wheel 309 journaled loosely on the screw 304 and formed with an extended hub portion 310 threaded within a pillow block 311 and having a bearing against a thrust collar 312 fixed to the screw and against hub portions 313 of hand wheel 307.

The carriages 12 are removably secured to slide 11 by stud bolts 315 and are formed with central recesses to receive hubs 316 on the underside of roll blocks 300 and heads 314 of swivel bolts 301 as best shown in Fig. 21. The blocks are formed with a rudder portion 317 to guide the roll 302 journaled thereon. To obtain precision and stability in the burnishing process, the rolls 302 are held in predetermined relation to the axle journal and manipulated by means of hand wheels 318 fitted with supporting studs 319 tapped into bearings 320 on opposite sides of the rudder pieces 317 with their protruding ends engaging the rudder sides. By the rotation of wheels 318 in one direction or the other, the blocks 300 and therefore the rolls 302 may be adjusted to the desired angularity and firmly held against the rotating axle journal.

In like manner the carriages 7 on the opposite side of the journal are arranged to carry their rolls 303 also at an angle to the journal and rigidly held there against with a pressure equal to that exerted by their fellow rolls 302 to balance the load upon the lathe centers 23 and 53 during the burnishing operation. With rolls 302 and 303 arranged at the desired angularity with respect to the axle and speed of the work, the rotating axle will draw the rolls with their respective carriages and slides 11 and cause them to traverse the length of the journals at speeds and pressures proportioned to the angularity of the rolls and degree of finish to be given the work. The rolls and slides may be quickly returned to initial position by manipulation of the customary pinion wheel 325 on the slide apron or in any other approved manner, and the burnishing operation repeated until the desired finish is obtained.

The manipulation of the burnishing mechanism at both ends of the lathe and the finishing operation on both journals of the axle may be carried out by one operator after the required angularity of the rolls, degree of pressure, and the speed of the work have been once determined. Both rolls move simultaneously toward and/or away from their respective sides of the axle by rotation of hand wheel 307 which, being fixed to feed screw 304 will cause right and left threads tapped respectively in bearings 305 and 306 in carriages 300 and 7. By manipulation of hand wheel 309, loosely mounted on the feed screw spindle between hub 313 of wheel 307 and thrust collar 312 fixed to the same spindle, both carriages are moved in the same direction by rotation of the threaded wheel hub 310 within pillow block 311 after the carriages have first been spaced apart, to permit the use of but one of the rolls should the nature of the work require such operation. As will be obvious, the burnishing operation is initiated by causing one or both of the rolls to bear against the rotating axle journal and traverse the journal periphery at a slight pitch whereby the rolls and carriage are caused to move as the rolls tread the journal surface as before stated.

Figure 22:
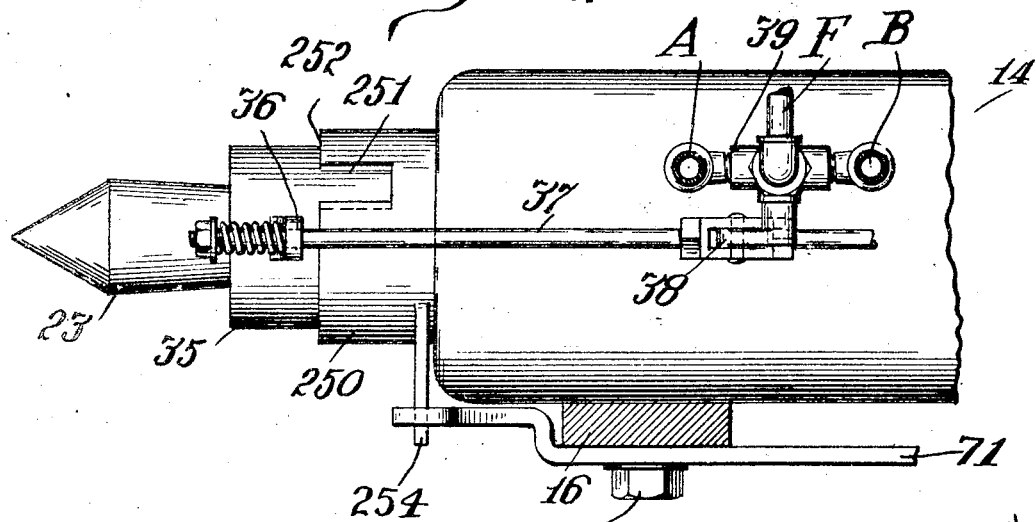
Fig. 22 is a plan view of the quick acting tail stock illustrated in Fig. 3, showing the stock fitted with the automatic safety locking device of the invention.

To avoid premature withdrawal of the lathe centers 23 and 53 by control lever 22 by a pull on connecting rod 24 joined with center spindle 35, the spindle is fitted with a locking collar 250 as best shown in Fig. 22. The collar is formed with an open slot 251 positioned, when the centers are engaging the axle and the lathe is in operation, upon one side of post 36 engaged by the valve rod 37 controlling the valves 39 and 40 communicating with the air-hoist 15 and air-operated tail-stock 13.

The spindle 35 cannot be moved outwardly until slot 251 of the collar 250 is brought to a position abreast the post 36 when a pull outwardly upon lever 22 will draw post 36 into the slot to permit resulting manipulation of the air valves. Until the collar is shifted to bring the slot to the post position, any attempt to pull lever 22 outwardly to operate the air-hoist and centers will be prevented by engagement of the post 36 with peripheral edge 252 of the collar 250. The shifting of slot 251 is effected by rotating the collar on the center spindle 35 by the manipulation of safety locking arm 71 fulcrumed on pin 253 secured to super-structure framing member 16 and connected at its inner end to a projecting arm 254 fixed to collar 250.

The locking arm inner end is raised to lift collar arm 254 to cause rotation of the collar 250 to shift slot 251 away from post 36 to lock spindle 35 and control lever 22 against outward movement as above explained. The reverse movement of the collar 250 and the registering of slot 251 and spindle post 36 will dispose the mechanism for releasing the work as will be obvious. As previously pointed out, control levers 22 and 75 are thrown to the left or inwardly to begin operations and outwardly and to the right to cease operations and release the work. In the same manner lever 141, controlling four-way valve 140 for regulating air-line M feeding the air-jack cylinder 149 and bottom of auxiliary cylinder 150, and air-line N leading to upper side of said auxiliary cylinder, is moved to the left to lower air-jack and raise platform 184, and the reverse of these movements when lever 141 is thrown to the right when air is admitted to lower end of air-jack cylinder and to lower end of auxiliary cylinder 150 while air in upper end of auxiliary is exhausting through air-line O as best indicated in Fig. 1.

It will be noted that there has been provided manually controlled mechanism for automatically feeding axles to and mounting them upon a lathe, burnishing and discharging them, and controlled by valve mechanism operable in association with auxiliary means designed to insure the sequence of operations described from the time the rough turned axles are deposited upon the skid frame 8 to the discharge of the axle upon the receiving platform 6 shown in Fig. 16.

But three levers, 22, 75 and 141, are manipulated during the loading, unloading, and operating period, forming the cycle of movement comprising the feeding of the axles to centering clamps 206, aligning the axles between the clamps, releasing the centered axles from between the clamps, thrusting them upon the rotating rollers 196 and 197 for brushing, whence they are lifted by stud post 199 during the lowering movement of the platform 184 into the path of a battery of lubricating brushes 215 and transferred by the platform to skid frame bars 154 at the lathe position as shown in Figs. 15 and 16 supported upon the air-jack plunger 19. The axles are lowered to the lathe centers, split gear upper housing 107 with its upper gear segment 88 is lowered and clamped to lower half, and axles gripped by driving pawls 92 and 93 as shown in Fig. 12, clutch 64 is then engaged and driving motor started, and the burnishing operation begun.

Assuming all parts to be in the operating position shown, and it is desired to remove the finished axle, the machine is brought to a stop by throwing lever 75 to the right. This movement causes arm 74 of the lever to depress switch button 69 to shut off the driving motor, the shifting of the lever causing operation of four-way valve 70 to exhaust the air from clutch operating cylinder 63 shown in Figs. 1 and 2, to disengage clutch 64 from the driving gear wheel 79, and simultaneously admitting air to cylinder 62 for positioning the split gear axle drive mechanism 17 shown in Figs. 7 to 11 inclusive, and shifting safety collar 250 to a position with its slot 251 aligned with spindle post 36, to permit withdrawal of operating center 23 from the axle by control lever 22.

To withdraw center 23 from the axle, control lever 22 is first drawn towards the operator to cause rotation of the adjustable tail-stock head 28 with lever bracket 29 and frame 26 to approximately the broken line position shown in Fig. 4. This permits the adjacent end of axle to slowly settle to rest upon underlying shelf 5, whereupon the lever is thrown to the right as indicated in broken lines in Fig. 3, to wholly withdraw centers 23 and 53, and charging lower air-cylinder 41, shown in Fig. 2, to depress plunger 43 and with it the yoke frame 54 connected to bent lever 45 controlling center 53, and simultaneously exhausting the air from upper cylinder 42, admitting air to underside of piston in cylinder 15 to raise split gear upper housing 107 with its upper gear segment 88, the end of the axle released by center 53 being lowered to underlying shelf 4 best shown in Fig. 2.

With the axle fully released from the operating parts of the lathe, lever 141 controlling valve 140 is thrown to the right to admit air to air-jack cylinder 149 to lift the axle to the level of receiving platform 6 as shown in broken lines in Fig. 13, and charging lower end of auxiliary cylinder 150 to lower the transferring platform 184 to deliver the next succeeding axle to the lathe for a burnishing operation, as before outlined.

What I claim is:

1. A burnishing machine comprising in combination, a burnishing lathe, mechanism including a movable loading platform for delivering work to said lathe, other mechanism for automatically adjusting said work, means operatively connecting said adjusting and delivery mechanism, and manually operable means including a plurality of valves and associated levers controlling said mechanism, and fluid pressure cylinders controlled by said valves for operating said adjusting means and the platform.

2. In a burnishing machine, the combination comprising a burnishing lathe, mechanism including a movable loading platform for delivering work to said lathe, other mechanism for automatically adjusting said work, means operatively connecting said adjusting and delivery mechanism, locking means including a plurality of valves and associated levers for said mechanism, and manually operable means controlling said mechanism and locking means, and fluid pressure cylinders controlled by said valves for operating said adjusting means and the platform.

3. In a burnishing machine, the combination comprising a burnishing lathe, driving means for said lathe, mechanism including a movable loading platform for delivering work to the lathe, means on the lathe for receiving and adjusting the work, clutching mechanism associated with said driving means, locking mechanism for said receiving and adjusting means, and means common to said clutching and locking mechanism for releasing said work.

4. In a burnishing machine, the combination comprising a burnishing lathe, mechanism including a movable loading platform for delivering work to the lathe, associated mechanism for receiving and adjusting said work, air and hand operated centers engageable with the work, and common means manually operable for controlling said centers and the receiving and adjusting mechanism.

5. In a burnishing machine, the combination comprising a burnishing lathe, mechanism including a movable loading platform for delivering work to the lathe, mechanism for receiving and driving said work, associated mechanism for adjusting and locking said mechanism, and manually operable means controlling said mechanism.

6. In a burnishing machine, the combination comprising a burnishing lathe, mechanism including a movable loading platform for delivering work to the lathe, multi-part mechanism for receiving and driving said work, associated mechanism for adjusting and locking said mechanism, and manually operable means controlling said mechanism.

7. In a burnishing mechanism, the combination comprising a burnishing lathe, mechanism including a movable loading platform for delivering work to the lathe, multi-part mechanism for receiving and driving said work having relatively movable sections, mechanism for adjusting and locking said mechanism, and manually operable means controlling said mechanism.

8. In a burnishing machine, the combination comprising a burnishing lathe, mechanism including a movable loading platform for delivering work to said lathe, divided gear housing mechanism separable to receive said work, segmental gear sections carried by said housing mechanism for driving said work, mechanism for adjusting and locking said housing and gear mechanism, and manually operable means controlling said mechanism.

9. In a burnishing machine, the combination comprising a burnishing lathe, mechanism including a movable loading platform for delivering work to said lathe, relatively movable work receiving housings, sectional work driving means carried by said housings, mechanism for adjusting and locking said receiving and driving mechanism, and manually operable means controlling said mechanism.

10. In a burnishing machine, the combination comprising a burnishing lathe, mechanism including a movable loading platform for delivering work to the lathe, divided gear housing portions separable to receive said work, divided gear portions carried by said housing, mechanism operatively uniting and locking said gear and housing portions respectively, a power gear meshing with the gear segments for driving the work, and manually operable means controlling said mechanism.

11 In a burnishing machine, the combination comprising a burnishing lathe, mechanism including a movable loading platform for delivering work to the lathe, divided gear and housing elements separable to receive said work, mechanism operatively uniting and locking said gear and housing portions respectively, pawl mechanism carried by the gear and having driving engagement with the work, a power gear meshing with said divided gear portions, and manually operable means controlling said mechanism.

12. In a burnishing machine, the combination comprising a burnishing lathe, mechanism including a movable loading platform for delivering work to the lathe, a divided housing separable to receive said work, complemental gear portions carried in said housing, associated means for raising certain of said gear and housing portions, mechanism carried by said means for operatively uniting and locking said gear and housing portions respectively, work driving mechanism, and manually operable means controlling said mechanism.

13. In a burnishing machine, the combination comprising a burnishing lathe, mechanism including a movable loading platform for delivering work to the lathe, divided gear and housing elements having their respective upper portions movable to receive said work, means carried by the upper housing portion for operatively uniting and locking said gear and housing portions respectively, means for lifting said upper housing and gear portions, and mechanism carried by said lifting means for actuating said locking means.

14. In a burnishing machine, the combination comprising a burnishing lathe, mechanism including a movable loading platform for delivering work to the lathe, horizontally divided gear and housing elements having relatively movable portions separable to receive said work, and means for lifting said movable gear and housing portions.

15. In a burnishing machine, the combination comprising a burnishing lathe, mechanism including a movable loading platform for delivering work to the lathe, horizontally divided gear and housing elements having relatively movable portions separable to receive said work, and common means for lifting and locking said gear and housing portions.

16. In a burnishing machine, the combination comprising a burnishing lathe, mechanism including a movable loading platform for delivering work to the lathe, horizontally divided gear and housing elements having relatively movable portions separable to receive said work, housing and gear locking bars rockably mounted on said movable housing portions, and housing and gear lifting means for actuating said bars.

17. In a burnishing machine, the combination comprising a burnishing lathe, mechanism for delivering work to the lathe, divided gear and housing elements having relatively movable portions separable to receive said work, locking means for said elements carried on said movable housing and including a pair of locking bars rockable to lock and release said housing, release springs connecting said bars, lifting means adapted to initially actuate said bars, and thrust links engaging said bars and lifting means to oppose the pressure of said springs.

18. In a burnishing machine, the combination comprising a burnishing lathe, mechanism for delivering work to said lathe, divided gear and housing elements having relatively movable portions separable to receive said work, locking means for said elements carried on said movable housing portion including locking bars, springs, thrust links pivotally secured at their respective outer ends to said bars, lifting means, and a thrust block secured to said lifting means yieldably engaging said housing and links and adapted to actuate said bars against the pressure of said springs to lock said gear and housing.

19. In a burnishing machine, the combination comprising a burnishing lathe, mechanism for delivering work to the lathe, horizontally divided gear and housing elements having relatively movable portions separable to receive said work, lifting means, an overhead framing supporting said lifting means, and guiding means on said framing and movable housing.

20. In a burnishing machine, the combination comprising a burnishing lathe, mechanism for delivering work to the lathe, horizontally divided gear and housing elements having lower and relatively movable upper portions separable to receive said work, lifting means for said upper gear and housing portions, a driving shaft, a power gear fixed to said shaft and meshing with said divided gear, and cam mechanism fixed to said shaft for positioning said divided gear to permit lifting of said upper housing and contained gear segment.

21. In a burnishing machine, the combination comprising a burnishing lathe including air and manually operable centers and manually operable controlling means common to said centers, of divided gear and housing elements having relatively movable portions, lifting means for said movable portions, cam mechanism for centering said gear portions, means for locking said cam mechanism, and link and rocker-bar mechanism connecting said cam locking means and air operated center.

22. In a burnishing machine, the combination comprising a burnishing lathe having air and hand operated centers, manually operable means controlling said centers, and means associated with said controlling means for effecting minor adjustments of said hand operated center independently of the other center.

23. In a burnishing machine, the combination comprising a burnishing lathe having air and hand operated centers, manually operable controlling means common to said centers, and means associated with said controlling means for effecting simultaneous major movements of both centers and independent minor adjustment of said hand operated center.

24. In a burnishing machine, the combination comprising a burnishing lathe including air and hand operated centers and manually operable controlling mechanism common to said centers, of divided gear and housing elements having relatively movable portions, lifting means for said movable portions, means associated with said controlling means for effecting successive movements of said lifting means and centers, and locking means for said controlling mechanism.

25. In a burnishing machine, the combination comprising a burnishing lathe including air and hand operated centers and manually operable controlling mechanism common to said centers, of divided gear and housing elements having relatively movable portions, lifting means for said movable portions, means associated with said controlling means for effecting successive movements of the centers and lifting means, clutch and switch mechanism carried by said lathe, locking means for said controlling mechanism, and means controlling said clutch and switch mechanism for operating said locking means.

26. In a burnishing machine, the combination comprising a burnishing lathe, mechanism for delivering work to the lathe, other mechanism associated with said lathe for receiving said work, means for automatically adjusting said work, and stops carried by said adjusting mechanism and engageable with a relatively fixed portion of the lathe for successively limiting upward movement of opposite sides of said adjusting means for imparting a jarring impulse to the work to discharge it from the lathe.

27. In a burnishing machine, the combination comprising a burnishing lathe, automatic mechanism for delivering work to the lathe, other mechanism associated with said lathe for receiving said work, means for automatically adjusting said work, connecting means for synchronizing the movements of said delivery and adjusting mechanism including a plurality of crank arms respectively secured to said mechanism, and mechanism operable by the synchronizing means for feeding work to said delivery mechanism.

28. A burnishing machine comprising in combination, a burnishing lathe, automatic work receiving mechanism associated with said lathe, a skid table in spaced operative relation to said lathe, a relatively movable platform pivotally mounted on said table for delivering work to the lathe, other mechanism on said table operable by said platform for feeding work to the platform, and means operatively connecting said lathe and platform.

29. A burnishing machine comprising in combination, a burnishing lathe, automatic means for delivering work to said lathe including a skid table in spaced operative relation to the lathe, a relatively movable platform pivotally mounted on said table and adapted to span the space between table and lathe, other mechanism on said table operable by said platform for feeding work to the platform, and means operatively connecting said lathe and platform.

30. A burnishing machine comprising in combination, a burnishing lathe, means for delivering work to said lathe including a gravity feed skid table in spaced operative relation to the lathe, a relatively movable platform pivotally mounted on said table and adapted to span the space between table and lathe, thrust mechanism on said table operable by said platform to positively feed work to the platform, and means operatively connecting said lathe and platform.

31. In a burnishing machine, the combination including a burnishing lathe, of means for delivering work to said lathe comprising a gravity feed skid table in spaced operative relation to the lathe, a relatively movable platform pivotally mounted on said table and adapted to span the space between table and lathe, means operatively connecting said lathe and platform, thrust mechanism on said table operable by the raising of said platform to positively feed work to the platform, and associated means for previously centering the work upon the table when platform is lowered.

32. In a burnishing machine, the combination including a burnishing lathe, of means for delivering work to the lathe comprising a gravity feed skid table in spaced operative relation to the lathe, a relatively movable platform pivotally mounted on said table and adapted to span the space between table and lathe, means operatively connecting said lathe and platform, and means successively operable by the raising and lowering movements of said platform including thrust mechanism on said table for positively feeding work to the platform, associated mechanism for previously centering the work upon the table, and work lubricating and brushing mechanism.

33. In a burnishing machine, the combination including a burnishing lathe, of means for delivering work to the lathe comprising a gravity feed skid table in spaced operative relation to the lathe, a relatively movable platform pivotally mounted on said table and adapted to span the space between table and lathe, thrust mechanism operable by said platform for positively feeding work to the platform, means operatively connecting said lathe and platform, and work centering means.

34. In a burnishing machine, the combination including a burnishing lathe, of means for delivering work to the lathe comprising a gravity feed skid table in spaced operative relation to the lathe, a relatively movable platform pivotally mounted on said table and adapted to span the space between table and lathe, thrust mechanism operable by said platform for positively feeding work to the platform, means operatively connecting said lathe and platform, work receiving roller mechanism intermediate said thrust mechanism and platform for driving said work, overhanging brushing means engaging said driven work, work lubricating mechanism normally in the path of said work as the work is lifted from said rollers, and means for restoring said thrust mechanism.

35. In a burnishing machine, the combination comprising a burnishing lathe, automatic means for delivering work to the lathe, multi-part mechanism for receiving and driving said work, associated means for automatically adjusting said mechanism, and manually controlled power means for successively operating said mechanism.

In witness whereof I have hereto set my hand this 17th day of June, 1929.

GOMERT POWELL.